United States Patent [19]

Shiraki et al.

[11] Patent Number: 5,401,571
[45] Date of Patent: Mar. 28, 1995

[54] MAGNETIC RECORDING MEDIA HAVING A BINDER COMPRISING A SULFOBETAINE CONTAINING POLYURETHANE RESIN

[75] Inventors: Hiroyuki Shiraki, Kobe; Katsuhiro Hirata, Nishinomiya, both of Japan

[73] Assignee: Takeda Chemical Industries, Ltd., Osaka, Japan

[21] Appl. No.: 668,799

[22] Filed: Mar. 7, 1991

Related U.S. Application Data

[63] Continuation of Ser. No. 356,324, May 23, 1989, abandoned.

[30] Foreign Application Priority Data

May 27, 1988 [JP] Japan ................. 63-130970

[51] Int. Cl.⁶ .............................. G11B 5/00
[52] U.S. Cl. ................. 428/336; 252/62.54; 428/425.9; 428/694; 428/900; 528/71
[58] Field of Search ............ 524/157; 428/694, 900, 428/425.9, 336; 528/71; 252/62.54

[56] References Cited

U.S. PATENT DOCUMENTS

| | | | |
|---|---|---|---|
| 3,411,912 | 11/1968 | Dykstra | 96/87 |
| 4,152,485 | 5/1979 | Mizumura et al. | 428/425 |
| 4,507,458 | 3/1985 | Shiraki et al. | 528/49 |
| 4,533,601 | 8/1985 | Hermann et al. | 428/437 |
| 4,556,611 | 12/1985 | Nakajima | 428/694 |
| 4,578,314 | 3/1986 | Ohta et al. | 428/403 |
| 4,734,330 | 3/1988 | Oiyama et al. | 428/411.1 |
| 4,898,922 | 2/1990 | Shiraki | 528/76 |

FOREIGN PATENT DOCUMENTS 58-179936 10/1983 Japan.
62-88134 4/1987 Japan.

OTHER PUBLICATIONS

"Polyurethannes á propriétés émulsifiantes et electrolytiques" Jean—Francois Gerard, *Makromol Chem.* 189, 1693–1717 Jul. 1988.

*Primary Examiner*—Paul J. Thibodeau
*Assistant Examiner*—Steven A. Resan
*Attorney, Agent, or Firm*—Wenderoth, Lind & Ponack

[57] ABSTRACT

The sulfobetaine-containing resin has much improved affinity for magnetic powders. Therefore, by using the same as a binder, it becomes possible to attain good dispersion of magnetic powders superfine in particle size and/or large in amount of magnetization.

The binder can be used advantageously in the manufacture of magnetic recording media, such as magnetic tapes and magnetic disks.

7 Claims, No Drawings

MAGNETIC RECORDING MEDIA HAVING A BINDER COMPRISING A SULFOBETAINE CONTAINING POLYURETHANE RESIN

This application is a continuation of now abandoned application Ser. No. 356,324, filed May 23, 1989, now abandoned.

This invention relates to a binder for use in the manufacture of magnetic recording media, such as magnetic tapes and magnetic disks, and to magnetic recording media manufactured by using said binder.

Polyurethane resins, polyester resins, nitrocellulose, vinyl chloride-vinyl acetate copolymers, vinyl chloride-vinyl acetate-vinyl alcohol copolymers and the like have been used so far as binders for magnetic recording media. However, the recent trends in the use of magnetic powders finer in particle size and higher in magnetizability for the manufacture of high-performance magnetic recording media makes it almost impossible to secure sufficient dispersibility, surface smoothness and durability with the above-mentioned binders. Accordingly, to cope with the use of superfine magnetic powders, the use, as binder component, of a sulfonic acid metal salt group-containing polyester resin (Japanese Patent Publication No. 57-3134) or a sulfonic acid metal salt group-containing polyurethane resin (Japanese Patent Publication No. 58-41565) has been proposed.

Such sulfonic acid metal salt group-containing binders, which have hydrophilic polar groups, indeed have improved dispersing ability as compared with the binders having no polar groups but the real situation is that their dispersing ability is unsatisfactory as yet.

It is an object of the invention, which has been made to overcome the above-mentioned drawbacks that the prior art has, to provide a binder having a remarkable ability to disperse magnetic powders and to provide magnetic layers superior in surface smoothness and in durability.

As a result of their intensive investigations, the present inventors found that a sulfobetaine-containing resin can cause good dispersion even of superfine-particle magnetic powders to give good surface smoothness and durability and, based on this finding, have now completed the present invention.

Thus, the present invention relates to:
1. A sulfobetaine-containing resin,
2. A binder composition for magnetic recording media which comprises a sulfobetaine-containing resin; and
3. A magnetic recording medium which has a magnetic layer bound with a binder composition comprising a sulfobetaine-containing resin.

The sulfobetaine-containing resin to be used in accordance with the invention may be any of those resins which have a sulfobetaine moiety or moieties within the molecule. As such resins, there may be mentioned, for example, urethane resins, polyester resins, vinyl chloride copolymers, vinylidene chloride copolymers, acrylic resins, butadiene-acrylonitrile copolymers, styrene-butadiene copolymers and the like.

The content of the sulfobetaine moiety or moieties in the resin amounts to about 1 to 1,000 equivalents/$10^6$ g.

The urethane resins are producible, for example, by reacting a polyhydroxy compound or compounds with a polyisocyanate or polyisocyanates, sulfobetaine introduction into said urethane resins being effected by replacing part or whole of said polyhydroxy compound or compounds with a sulfobetaine-containing polyhydroxy compound or compounds. Usable as the sulfobetaine-containing polyhydroxy compounds are, for example, reaction products from a tertiary amine having two or more hydroxy groups, such as N-methyldiethanolamine, N-methyldiethanolamine-ethylene oxide adduct, N-methyldiethanolamine-propylene oxide adduct, aniline-ethylene oxide adduct, aniline-propylene oxide adduct or the like, and a sultone of the general formula

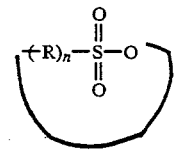

wherein —R— is a straight or branched alkylene group having a carbon number of 1 to 20, preferably 1 to 10, and n is an integer of 2 to 20, preferably 3 to 10, such as 1,3-propanesultone or the like. Sulfobetaine-containing polyester polyols are also usable as the polyhydroxy compounds. The sulfobetaine-containing polyester polyols can be prepared by conventional esterification from the sulfobetaine-containing polyhydroxy compound or compounds obtained in the above reaction, a glycol component or components having no sulfobetaine moiety and a carboxylic acid component or components.

As the glycol component having no sulfobetaine moiety to be used in the esterification reaction, there may be mentioned, for example, ethylene glycol, propylene glycol, 1,3-propanediol, 1,4-butanediol, 1,5-pentanediol, 1,6-hexanediol, neopentyl glycol, diethylene glycol, dipropylene glycol, 2,2,4-trimethyl-1,3-pentanediol, 1,4-cyclohexanedimethanol, bisphenol A-ethylene oxide adducts, bisphenol-A propylene oxide adducts, hydrogenated bisphenol A-ethylene oxide adducts, hydrogenated bisphenol A-propylene oxide adducts, polyethylene glycol, polypropylene glycol and polytetramethylene glycol. Triols and tetraols, such as trimethylolethane, trimethylolpropane, glycerin and pentaerythritol, may be used additionally. As the carboxylic acid component, there may be mentioned aromatic dicarboxylic acids, such as terephthalic acid, isophthalic acid, phthalic acid and 1,5-naphthalic acid, aromatic hydroxycarboxylic acids, such as p-hydroxybenzoic acid and p-(hydroxyethoxy)benzoic acid, aliphatic dicarboxylic acids, such as succinic acid, adipic acid, azelaic acid, sebacic acid and dodecanedicarboxylic acid, and tri- and tetracarboxylic acids, such as trimellitic acid, trimesic acid and pyromellitic acid.

Among the polyhydroxy compounds to be used in the production of the above-mentioned sulfobetaine-containing urethane resins, a combination of a long-chain diol having a molecular weight of about 500 to 30,000 and a short-chain glycol having a molecular weight of about 60 to 400 is preferred as the polyhydroxy compounds having no sulfobetaine moiety.

As the long-chain diol to be used in accordance with the invention, there may be mentioned, for example, polyester diols, polycarbonate diols and polyether diols. The polyester diols include, among others, polyester diols obtained by polycondensation of a polybasic acid, such as adipic acid, succinic acid, azelaic acid, sebacic acid, phthalic acid, isophthalic acid or terephthalic acid, and a polyhydric alcohol, such as 1,4-butanediol, 1,3- butanediol, ethylene glycol, diethylene glycol, propylene glycol, trimethylene glycol, dipropylene glycol, 1,6-hexanediol or neopentyl glycol, and lactone-derived polyester diols obtained by ring opening polymerization of a lactone, such as ε-caprolactone. Suitable as the polycarbonate diols are, for example, polycarbonate diols obtained by polycondensation of 1,6-hexanediol and diethyl or diphenyl carbonate. As the polyether diols, there may be mentioned, for example, polyethylene ether glycol, polypropylene ether glycol, polytetramethylene ether glycol, and copolymerized polyether glycols thereof.

Examples of the short-chain diol having a molecular weight of 60 to 400, which is to be used in accordance with the invention, are ethylene glycol, diethylene glycol, propylene glycol, dipropylene glycol, 1,4-butanediol, 1,3-butanediol, 1,4-cyclohexanediol, 1,4-cyclohexanedimethanol, bisphenol A-ethylene oxide adducts, bisphenol A-propylene oxide adducts, and the like. Furthermore, triols, such as glycerin, trimethylolpropane and 3-methyl-1,3,5-pentanetriol, may be used in addition to said diols. The proportion of the short-chain diol may vary depending on the molecular weight and kind of the long-chain diol but generally about 0.1 to 10 moles per mole of long-chain diol.

The polyisocyanate to be reacted with the polyhydroxy compound in the practice of the invention may be an aromatic, aliphatic, alicyclic or araliphatic one. Suitable examples are organic diisocyanates, such as tetramethylene diisocyanate, hexamethylene diisocyanate, ω, ω'-diisocyanatodimethylcyclohexane, dicyclohexylmethane diisocyanate, isophorone diisocyanate, ω, ω'-diisocyanatodimethylbenzene, methylcyclohexylene diisocyanate, lysine diisocyanate, tolylene diisocyanate and diphenylmethane diisocyanate, polymers of these organic diisocyanates, and polyisocyanates obtained by reacting an excess of any of such organic diisocyanates with an active hydrogen-containing low-molecular-weight compound, such as ethylene glycol, propylene glycol, dipropylene glycol, butylene glycol, trimethylolpropane, hexanetriol, glycerin, sorbitol, pentaerythritol, castor oil, ethylenediamine, hexamethylenediamine, ethanolamine, diethanolamine, triethanolamine, water, ammonia or urea, or with an active hydrogen-containing high-molecular-weight compound, such as any of various polyether polyols, polyester polyols and acrylic polyols, as well as biuret or allophanate derivatives of these.

The sulfobetaine-containing urethane resin according to the invention can be prepared by reacting at least one sulfobetaine-containing polyhydroxy compound or a mixture of at least one sulfobetaine-containing polyhydroxy compound and at least one sulfobetaine-free polyhydroxy compound with at least one polyisocyanate in a solvent or without using any solvent, preferably in a mixing ratio of about 0.7 to 1.2/1 in terms of the NCO groups in polyisocyanate/OH groups in polyhydroxy compound ratio. The sulfobetaine-containing polyhydroxy compound is used preferably in an amount such that the sulfobetaine content in urethane resin amounts to about 1 to 1,000 equivalents/$10^6$ g. When the sulfobetaine content is below 1 equivalent/$10^6$ g, the urethane resin cannot produce any sufficient effect on the dispersibility of ferromagnetic powders in some instances. When, on the other hand, said content is above 1,000 equivalents/$10^6$ g, intramolecular or intermolecular aggregation may readily take place, exerting an adverse influence on the dispersibility.

In carrying out the above reaction, a known urethane bond formation catalyst, such as stannous octoate, dibutyltin dilaurate, a tertiary amine or the like, may be used as necessary.

It is also possible to carry out the above reaction in an inert solvent, for example an aromatic solvent, such as toluene, xylene or benzene, a ketone solvent, such as acetone, methyl ethyl ketone, methyl isobutyl ketone or cyclohexanone, a halogenated hydrocarbon, such as dichloromethane or 1,1,1-trichloroethane, an acetate solvent, such as ethyl acetate, propyl acetate, isopropyl acetate or butyl acetate, N,N-dimethylformamide, N,N-dimethylacetamide, tetrahydrofuran, or di-n-butyl ether. The solvent is used generally in an amount such that the solid content amounts to about 20 to 80% by weight.

The thus-obtained sulfobetaine-containing urethane resin may be diluted, as necessary, with the solvent used in the above reaction. The urethane resin has a molecular weight of about 5,000 to 200,000, preferably about 10,000 to 100,000, and has markedly improved affinity for magnetic powders owing to the presence of sulfobetaine moieties within the molecule and thus can disperse even superfine magnetic powders or magnetic powders showing a large amount of magnetization to a satisfactory extent.

As the sulfobetaine-containing polyester resins to be used in the practice of the invention, there may be mentioned polyester polyols obtained by conventional esterification reaction, for example, from a sulfobetaine-containing polyhydroxy compound derived from a tertiary amine having two or more hydroxy groups, such as N-methyldiethanolamine, N-methyldiethanolamine-ethylene oxide adduct, N-methyldiethanolamine-propylene oxide adduct, aniline-ethylene oxide adduct or aniline-propylene oxide adduct, by reaction with a sultone of the general formula

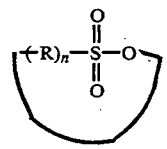

wherein —R— is a straight or branched alkylene group having a carbon number of 1 to 20, preferably 1 to 10 and n is an integer of 2 to 20, preferably 3 to 10, such as 1,3-propanesultone, a sulfobetaine-free glycol component and a carboxylic acid component. The polyester resins have a molecular weight of about 1,000 to 200,000, preferably about 5,000 to 100,000. As the sulfobetaine-free glycol component, there may be mentioned, for example, ethylene glycol, propylene glycol, 1,3-propanediol, 1,4-butanediol, 1,5-pentanediol, 1,6-hexanediol, neopentyl glycol, diethylene glycol, dipropylene glycol, 2,2,4-trimethyl-1,3-pentanediol, 1,4-cyclohexanedimethanol, bisphenol A-ethylene oxide adducts, bisphenol-A propylene oxide adducts, hydrogenated bisphenol A-ethylene oxide adducts, hydrogenated bisphenol A-propylene oxide adducts, polyethylene glycol, polypropylene glycol and polytetramethylene glycol. Triols and tetraols, such as trimethylolethane, trimethylolpropane, glycerin and pentaerythritol, may be used additionally. As the carboxylic acid component, there may be mentioned aromatic dicarboxylic acids, such as terephthalic acid, isophthalic acid, phthalic acid and 1,5-naphthalic acid, aromatic hydroxycarboxylic acids, such as p-hydroxybenzoic acid and p-(hydroxyethoxy)benzoic acid, aliphatic dicarboxylic acids, such as succinic acid, adipic acid, azelaic acid, sebacic acid and dodecanedicarboxylic acid, and tri- and tetracarboxylic acids, such as trimellitic acid, trimesic acid and pyromellitic acid.

The sulfobetaine-containing vinyl chloride copolymers to be used in the practice of the invention are copolymers of vinyl chloride and a sulfobetaine-containing monomer copolymerizable therewith, which is used as a constituent, together with or without a further comonomer or comonomers. Usable as the sulfobetaine-containing monomer copolymerizable with vinyl chloride are reaction products from a tertiary amino-containing vinyl monomer, such as N,N-dimethylacrylamide, N,N-dimethylaminoethyl acrylate, N,N-dimethylaminoethyl methacrylate, N,N-diethylaminoethyl acrylate or N,N-dimethylaminopropyl acrylamide, and a sultone of the general formula

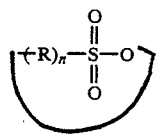

wherein —R— is a straight or branched alkylene group having a carbon number of 1 to 20, preferably 1 to 10 and n is an integer of 2 to 20, preferably 3 to 10, such as 1,3-propanesultone. As other comonomer components, vinyl acetate, vinyl propionate, vinyl alcohol, vinylidene chloride, acrylonitrile, maleic anhydride, maleic acid, acrylic acid, methacrylic acid, hydroxyethyl methacrylate, hydroxyethyl acrylate, hydroxypropyl methacrylate, hydroxypropyl acrylate, glycidyl methacrylate and the like are used either singly or in combination. The polymerization is carried out under pressure with warming using an oil-soluble polymerization initiator, such as benzoyl peroxide, and a solvent, such as acetone, to give the sulfobetaine-containing vinyl chloride copolymers according to the invention.

The sulfobetaine-containing vinylidene chloride copolymers are producible in the same manner as the above-mentioned vinyl chloride copolymers by using vinylidene chloride in lieu of vinyl chloride.

The sulfobetaine-containing acrylic resins to be used in accordance with the invention are copolymers of an acrylate ester or esters and a sulfobetaine-containing monomer copolymerizable therewith, which is used as a constituent. Usable as the sulfobetaine-containing monomer copolymerizable with acrylate esters are reaction products from a tertiary amino-containing vinyl monomer, such as N,N-dimethylacrylamide, N,N-dimethylaminoethyl acrylate, N,N-dimethylaminoethyl methacrylate, N,N-diethylaminoethyl acrylate or N,N-dimethylaminopropylacrylamide, and a sultone of the general formula

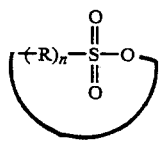

wherein —R— is a straight or branched alkylene group having a carbon number of 1 to 20, preferably 1 to 10 and n is an integer of 2 to 20, preferably 3 to 10, such as 1,3-propanesultone. As the acrylate esters, there may be mentioned, for example, ethyl acrylate, propyl acrylate, butyl acrylate, methyl methacrylate, ethyl methacrylate, propyl methacrylate, butyl methacrylate, hydroxyethyl acrylate, hydroxyethyl methacrylate, hydroxypropyl acrylate, hydroxypropyl methacrylate, glycidyl methacrylate and the like. Additionally, styrene, maleic acid, maleic anhydride, acrylic acid, methacrylic acid, fumaric acid, dibutyl fumarate and the like may also be used.

One or two or more of these and the sulfobetaine-containing monomer are copolymerized generally in a solvent using a polymerization initiator, such as benzoyl peroxide, to give the acrylic resins according to the invention.

The sulfobetaine-containing butadiene-acrylonitrile copolymers and styrenebutadiene copolymers to be used in accordance with the invention are copolymers obtained by using a sulfobetaine-containing monomer copolymerizable with butadiene, as a constituent. Usable as the sulfobetaine-containing monomer copolymerizable with butadiene are reaction products from a tertiary amino-containing vinyl monomer, such as N,N-dimethylacrylamide, N,N-dimethylaminoethyl acrylate, N,N-dimethylaminoethyl methacrylate, N,N-diethylaminoethyl acrylate or N,N-dimethylaminopropylacrylamide, and a sultone of the general formula

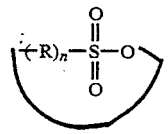

wherein —R— is a straight or branched alkylene group having a carbon number of 1 to 20, preferably 1 to 10 and n is an integer of 2 to 20, preferably 3 to 10, such as 1,3-propanesultone. As for other comonomer components, acrylonitrile or styrene is used as an essential component and, in addition, ethyl acrylate, propyl acrylate, butyl acrylate, methyl methacrylate, ethyl methacrylate, propyl methacrylate, butyl methacrylate, hydroxyethyl acrylate, hydroxyethyl methacrylate, hydroxypropyl acrylate, hydroxypropyl methacrylate, glycidyl methacrylate, maleic acid, maleic anhydride, acrylic acid, methacrylic acid, fumaric acid, dibutyl fumarate and the like may also be used.

One or two or more of these and the sulfobetaine-containing monomer are copolymerized generally in a solvent using a polymerization initiator, such as benzoyl peroxide, to give the copolymers according to the invention.

The resin to be used in accordance with the invention may be a combination of two or more of the above-mentioned resins or a combination of one or more of them with another resin or other resins.

As such other resins, there may be mentioned thermoplastic resins having a softening point not lower than 150° C., an average molecular weight of 10,000 to 200,000 and polymerization degree of about 200 to 2,000, such as vinyl chloride-vinylidene chloride copolymers, vinyl chloride-acrylonitrile copolymers, butadiene-acrylonitrile copolymers, acrylate ester-acrylonitrile copolymers, thermoplastic polyurethane elastomers, polyvinyl fluoride, vinylidene chloride-acrylonitrile copolymers, butadieneacrylonitrile copolymers, polyamide resins, polyvinylbutyral, cellulose derivatives, polyester resins, polybutadiene and the like synthetic rubber-type thermoplastic resins. Mention may also be made, for example, of phenol resins, epoxy resins, curable polyurethane resins, melamine resins, alkyd resins, silicone resins, reactive acrylic resins, epoxy-polyamide resins, nitrocellulosemelamine resins, mixtures of a high-molecular-weight polyester resin and an isocyanate prepolymer, mixtures of a methacrylate salt copolymer and a diisocyanate prepolymer, mixtures of a polyester polyol and a polyisocyanate, urea-formaldehyde resins, low-molecular-weight glycol/high-molecular-weight diol/triphenylmethane triisocyanate mixtures, polyamine resins, mixtures of these, and the like thermosetting resins and reactive resins. Among these, those which allow good dispersion of ferromagnetic powders are desirable for combined use.

These resins may contain one or more carboxyl, sulfonic acid metal salt, phosphate ester, amino and/or quaternary ammonium salt groups.

A ferromagnetic powder is dispersed in the thus obtained binder for magnetic recording media, dissolved as necessary in a solvent such as mentioned above, and the resulting composition is applied to a nonmagnetic support to form a magnetic layer.

As the ferromagnetic powder to be used in the practice of the invention, there may be mentioned ferromagnetic iron oxide particles, cobalt-added ferromagnetic iron oxide particles, ferromagnetic chromium dioxide, ferromagnetic alloy powders, hexagonal barium ferrite fine particles, iron nitride and the like.

The above-mentioned magnetic layer may further contain, in addition to the binder and ferromagnetic finer powder, additives, such as a dispersing agent, lubricant, abrasive, antistatic agent, rust preventive, curing catalyst, etc.

Usable as the dispersing agent are fatty acids containing 12 to 18 carbon atoms (R-COOH in which R is an alkyl or alkenyl group containing 11 to 17 carbon atoms), such as caprylic acid, capric acid, lauric acid, myristic acid, palmitic acid, stearic acid, oleic acid, elaidic acid, linolic acid, linolenic acid or stearolic acid, metal soaps of said fatty acids, namely alkali metal (Li, Na, K, etc,) salts or alkaline earth metal (Mg, Ca, Ba) salts, fluorine-containing ester derivatives of the above-mentioned fatty acids, amides of the above-mentioned fatty acids, polyalkylene oxide alkyl-phosphate esters, trialkyl-polyolefinoxy-quaternary ammonium salts (the alkyl being of 1 to 5 carbon atoms and the olefin being ethylene, propylene or the like) and the like. Furthermore, higher alcohols containing 12 or more carbon atoms, sulfate esters thereof and so forth may also be used.

Usable as the lubricant are silicone oils, such as dialkylpolysiloxanes (the alkyl being of 1 to 5 carbon atoms), dialkoxypolysiloxanes (the alkoxy being of 1 to 4 carbon atoms), monoalkylmonoalkoxypolysiloxanes (the alkyl being 1 to 5 carbon atoms and the alkoxy being of 1 to 4 carbon atoms), phenylpolysiloxanes and fluoroalkylpolysiloxanes (the alkyl being of 1 to 5 carbon atoms), electroconductive finer powders, such as graphite, inorganic fine powders, such as molybdenum disulfide and tungsten disulfide, fine powders of plastics, such as polyethylene, polypropylene, ethylene-vinyl chloride copolymer and polytetrafluoroethylene, α-olefin polymers, unsaturated aliphatic hydrocarbons (compounds with an n-olefinic double bond being bound to a terminal carbon atom; containing about 20 carbon atoms) which are liquid at ordinary temperature, fatty acid esters composed of a monobasic fatty acid containing 12 to 20 carbon atoms and a monohydric alcohol containing 3 to 12 carbon atoms, fluorocarbons and the like.

Usable as the abrasive are those materials that are in common use, such as fused alumina, silicon carbide, chromium oxide ($Cr_2O_3$), corundum, artificial corundum, diamond, artificial diamond, garnet, emery (main components: corundum and magnetite) and the like.

Usable as the antistatic agent are electroconductive fine powders, such as carbon black and carbon black-grafted polymers, naturally occurring surfactants, such as saponins, nonionic surfactants, such as alkylene oxide-based ones, glycerin-based ones and glycidol-based ones, cationic surfactants, such as higher alkylamines, quaternary ammonium salts, pyridine and other heterocyclics and phosphonium salts, anionic surfactants containing an acidic group, such as a carboxylic acid, sulfonic acid, phosphoric acid, sulfate ester or phosphate ester group, amphoteric surfactants, such as amino acids, aminosulfonic acids, sulfate or phosphate esters of aminoalcohols, and the like.

Usable as the above-mentioned rust preventive are phosphoric acid, sulfamide, guanidine, pyridine, amines, urea, zinc chromate, calcium chromate, strontium chromate and the like. In particular, the use of vapor phase corrosion inhibitors (inorganic or organic acid salts of amines, amides or imides), such as dicyclohexylamine nitrite, cyclohexylamine chromate, diisopropylamine nirite, diethanolamine phosphate, cyclohexylammonium carbonate, hexamethylenediamine carbonate, propylenediamine stearate, guanidine carbonate, triethanolamine nitrite and morpholine stearate, results in improved rust preventing effect.

Furthermore, for the purpose of improving the strength of magnetic recording media, a polyisocyanate is often incorporated as a curing agent component in magnetic paint compositions.

The polyisocyanate to be used as said curing agent component is a low-molecular-weight polyisocyanate having two or more isocyanato groups. Suited for use as such polyisocyanate are those organic polyisocyanates and polymers thereof which are usable in the production of the above-mentioned urethane resins, polyisocyanates obtained by reacting an excess of any of such organic diisocyanates with an active hydrogen-containing low-molecular-weight compound, such as ethylene glycol, propylene glycol, dipropylene glycol, butylene glycol, trimethylolpropane, hexanetriol, glycerin, sorbitol, pentaerythritol, castor oil, ethylenediamine, hexamethylenediamine, ethanolamine, diethanolamine, triethanolamine, water, ammonia or urea, or with an active hydrogen-containing high-molecular-weight compound, such as any of various polyether polyols, polyester polyols and acrylic polyols, as well as biuret or allophanate derivatives of these. They have a molecular weight of about 150 to 7,000.

The polyisocyanate may be used in the form of a solution in an inert solvent, for example an aromatic solvent, such as toluene, xylene or benzene, a ketone solvent, such as acetone, methyl ethyl ketone, methyl isobutyl ketone or cyclohexanone, a halogenated hydrocarbon, such as dichloro methane or 1,1,1-trichloroethane, an acetate solvent, such as ethyl acetate, propyl acetate isopropyl acetate or butyl acetate, N,N-dimethylformamide, N,N-dimethylacetamide, tetrahydrofuran, or di-n-butyl ether. In that case, the above solvent is used generally in an amount such that the solid content amounts to about 20 to 80% by weight.

While the resin/polyisocyanate mixing ratio is not limited to a particular range, it is preferable to use the polyisocyanate in an amount of about 3 to 80 parts by weight per 100 parts by weight of resin. As the curing catalyst, any of those catalysts mentioned above in reference to the production of urethane resins, for instance, may be used.

Usable as the material of the nonmagnetic support are, for example, polyesters, such as polyethylene terephthalate and polyethylene 2,6-naphthalate, polyolefins, such as polyethylene and polypropylene, cellulose derivatives, such as cellulose triacetate, cellulose diacetate, cellulose acetate butyrate and cellulose acetate propionate, vinyl resins, such as polyvinyl chloride and polyvinylidene chloride, and such plastics as polycarbonates, polyimides and polyamideimides. In certain applications, nonmagnetic metals, such as aluminum, copper, tin and zinc or nonmagnetic alloys containing these, ceramics, inclusive of glass, china and porcelain, and papers, for example papers coated with baryta or coated or laminated with an α-poly-$C_{2\text{-}10}$-olefin, such as polyethylene, polypropylene or ethylene-butene copolymer, may also be used. The nonmagnetic support may have the form of a film, tape, sheet, disk, card, drum or the like.

The coating composition is applied to the nonmagnetic support in an amount such that the film thickness after drying is about 0.1 to 50 μm.

Owing to the sulfobetaine, which is a hydrophilic polar group, the resin according to the invention has much improved affinity for magnetic powders. Therefore, by using the same as a binder, it becomes possible to attain good dispersion of magnetic powders superfine in particle size and/or large in amount of magnetization.

The binder according to the invention can be used advantageously in the manufacture of magnetic recording media, such as magnetic tapes and magnetic disks.

The following examples illustrate the invention in further detail.

Examples of Sulfobetaine-Containing Polyhydroxy Compound Synthesis

1. A reaction vessel equipped with a stirrer, thermometer and reflux condenser was charged with 120.15 g of benzene, 119.16 g of N-methyldiethanolamine and 61.07 g of 1,3-propanesultone. The mixture was stirred at 35° C. for 1 hour, and the resultant white crystalline precipitate was collected by filtration, washed with tetrahydrofuran and dried to give 118.2 g of white crystals (A). It was confirmed by FT-NMR analysis (400 MHz) that the product (A) had the following structure:

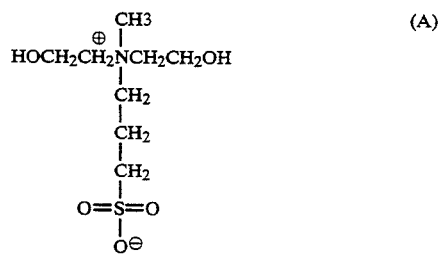

(A)

2. A reaction vessel equipped with a stirrer, thermometer and partial reflux condenser was charged with 182.6 g of adipic acid, 207.6 g of isophthalic acid, 95.0 g of ethylene glycol, 233.9 g of 1,6-hexanediol and 24.13 g of (A) obtained by the above procedure 1. Esterification was carried out at 160°–220° C. to give a polyester polyol (B) having a hydroxyl value of 187.

3. A polyester polyol (C) having a hydroxyl value of 114 was prepared by following the procedure 2 using 329.8 g of adipic acid, 374.9 g of isophthalic acid, 179.0 g of ethylene glycol, 292.6 g of neopentyl glycol and 4.82 g of (A).

4. A polyester polyol (D) having a hydroxyl value of 110 was prepared by following the procedure 2 using 329.8 g of adipic acid, 374.9 g of isophthalic acid, 171.9 g of ethylene glycol, 286.9 g of neopentyl glycol and 24.13 g of (A).

Examples of Urethane Resin Synthesis

1. A reaction vessel equipped with a stirrer, thermometer and reflux condenser was charged with 262.8 g of a polyester polyol (having a hydroxyl value of 115.3) prepared from adipic acid and 1,4-butanediol, 138 g of polyester polyol (B), 46.8 g of bisphenol A-propylene oxide adduct (hydroxyl value 311.7), 150 g of diphenylmethane diisocyanate, 697.2 g of methyl ethyl ketone, 697.2 g of toluene and 0.2 g of dibutyltin dilaurate. The contents were stirred at 80° C. until the viscosity became constant, to give a urethane resin (I) according to the invention. The urethane resin obtained had a sulfobetaine content of 35 equivalents/$10^6$ g and a molecular weight of 33,000.

2. A urethane resin (II) was obtained by following the above procedure 1 using 521.4 g of polycarbonate diol (Daicel's Placcel CD210; hydroxyl value 107.6), 300 g of polyester polyol (B), 8.9 g of trimethylolpropane, 48.2 g of 1,4-butanediol, 163.5 g of TDI-80, 128.1 g of isophorone diisocyanate, 585 g of methyl ethyl ketone, 585 g of toluene and 0.23 g of dibutyltin dilaurate. The sulfobetaine content was 40 equivalents/$10^6$ g and the molecular weight was 1,500.

3. A urethane resin (III) was prepared by following the procedure 1 using 500 g of polyester polyol (C), 9.7 g of 1,4-butanediol, 104.5 g of TDI-80, 716.8 g of methyl ethyl ketone, 716.8 g of toluene and 0.2 g of dibutyltin dilaurate. It had a sulfobetaine content of 16 equivalents/$10^6$ g and a molecular weight of 68,000.

4. A urethane resin (IV) was prepared by following the procedure 1 using 510 g of polyester polyol (D), 4.95 g of 1,4-butanediol, 19.8 g of bisphenol A-propylene oxide adduct (hydroxyl value 311.7), 745.8 g of methyl ethyl ketone, 745.8 g of toluene and 0.21 g of dibutyltin dilaurate. It had a sulfobetaine content of 78 equivalents/$10^6$ g and a molecular weight of 58,000.

Examples of Sulfobetaine-Containing Vinyl Chloride Copolymer Synthesis

1. A reaction vessel equipped with a stirrer, thermometer and reflux condenser was charged with 340 g of methyl ethyl ketone, 85.92 g of N,N-dimethyl propyl acrylamide and 61.07 g of 1,3-propanesultone.

The mixture was stirred at 35° C. for 1 hour, and the resultant white crystalline precipitate was collected by filtration, washed with tetrahydrofuran and dried to give 135.0 g of white crystals (E). It was confirmed by FT-NMR analysis (400 MHz) that the product (E) had the following structure:

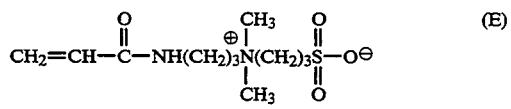
(E)

2. Into a stainless steel autoclave having inner volume of 10 l was charged $N_2$ gas to replace the air and were charged 1620 g of vinyl chloride, 291 g of vinyl acetate, 81 g of allylglycidyl ether, 11 g of sulfobetaine-containing acryl amide (E), 4000 g of methanol and 20 g of di-2-ethylhexyl peroxydicarbonate.

The mixture was heated to 40° C. under stirring and reacted for 12 hours.

The reaction mixture was cooled, and the resultant slurry was filtrated, washed with deionized water and dried to give 1311 g of copolymer powders. It was confirmed by FT-NMR analysis that the copolymer was composed of 83.3 weight % of vinyl chloride, 12.8 weight % of vinyl acetate, 3.6 weight % of allylglycidyl ether and 0.3 weight % of sulfobetaine-containing acryl amide and had average polymerization degree of 330.

A reaction vessel equipped with a reflux condenser was charged with 1000 g of the above copolymer, 3000 g of methanol and 35 g of NaOH.

The mixture was reacted at 50° C. for 4 hours to hydrolyze the copolymer.

After the reaction, the unreacted NaOH in the reaction mixture was neutralized and washed with methanol and deionized water, and filtrated and dried to give 914 g of vinyl chloride copolymer (I). It was confirmed that the copolymer (I) was composed of 88.7 weight % of vinyl chloride, 1.3 weight % of vinyl acetate, 6.0 weight % of vinyl alcohol, 3.8 weight % of allylglycidyl ether and 0.2 weight % of sulfobetaine-containing acryl amide. The average polymerization degree was 300.

3. In a similar manner to procedure 2, 1511 g of vinyl chloride, 395 g of vinyl acetate, 15 g of sulfobetaine-containing acryl amide (E) and 10 g of benzoyl peroxide were reacted. In the above, 8 g of KOH was used for hydrolysis of the resulting copolymer to give vinyl chloride copolymer (II) having average polymerization degree of 380. The copolymer was composed of 87.3 weight % of vinyl chloride, 5.8 weight % of vinyl acetate, 6.5 weight % of vinyl alcohol and 0.4 weight % of sulfobetaine-containing acryl amide.

Examples 1–4

| | |
|---|---|
| Co-containing $\gamma$-$Fe_2O_3$ | 400 weight parts |
| Urethane resin (I), (II), (III), (IV) | 50 weight parts (as solids) |
| Vinyl chloride-vinyl acetate-vinyl alcohol copolymer (UCC's VAGH) | 50 weight parts |
| Stearic acid | 4 weight parts |
| Butyl stearate | 4 weight parts |
| Methyl ethyl ketone | 300 weight parts |
| Methyl isobutyl ketone | 300 weight parts |
| Toluene | 300 weight parts |

The above composition was kneaded in a ball mill for 48 hours for effecting dispersion, then passed through a filter, and supplemented with 25 parts by weight of a polyisocyanate (trimethylolpropane-tolylene diisocyanate adduct; Takenate E-31; product of Takeda Chemical Industries). The whole composition was stirred for 30 minutes. The resultant magnetic paint was applied to a polyester film, treated in a magnetic field for orientation, dried and thereafter supercalendered and cured at 60° C. for 2 days. The results of some property measurements are shown in Table 1.

Comparative Example 1

The procedure of the above examples was followed except that a urethane resin (V) having no polar group was used in lieu of the urethane resins used in the examples. The results are shown in Table 1.

Comparative Example 2

The procedure of the above examples was followed except that a urethane resin (VI) having sulfonic acid sodium salt moieties in a content of 30 equivalents/$10^6$ g was used in lieu of the urethane resins used in the examples. The results are shown in Table 1.

TABLE 1

| | Urethane resin | Surface gloss[1] | Squareness ratio $Br/Bm$[2] |
|---|---|---|---|
| Example 1 | I | 96 | 0.84 |
| Example 2 | II | 96 | 0.84 |
| Example 3 | III | 90 | 0.82 |
| Example 4 | IV | 102 | 0.88 |
| Comparative Example 1 | V | 68 | 0.72 |
| Comparative Example 2 | VI | 83 | 0.80 |

[1]Surface gloss
Measured on the basis of the quantity of reflected light (incidence angle 60°) on a gloss meter (manufactured by Suga Shikenki).
[2]Squareness ratio
Measured on a magnetometer of the vibrating sample type (manufactured by Toei Kogyo).

Measured on the basis of the quantity of reflected light (incidence angle 60°) on a gloss meter (manufactured by Suga Shikenki).

(2) Squareness ratio

Measured on a magnetometer of the vibrating sample type (manufactured by Toei Kogyo).

As is evident from the table, it was demonstrated that when sulfobetaine-containing urethane resins are used, better dispersion of magnetic powders can be achieved and the magnetic recording media obtained have much improved surface and magnetic characteristics.

Examples 5 and 6

| | |
|---|---|
| Co-containing $\gamma$-$Fe_2O_3$ | 400 weight parts |
| Urethane resin (Takelac T-1145: product of Takeda Chemical Industries) | 50 weight parts |
| Vinyl chloride copolymers (I), (II) | 50 weight parts |
| Stearic acid | 4 weight parts |
| Butyl stearate | 4 weight parts |
| Methyl ethyl ketone | 300 weight parts |
| Methyl isobutyl ketone | 300 weight parts |
| Toluene | 300 weight parts |

The above composition was kneaded in a ball mill for 48 hours for effecting dispersion, then passed through a filter, and supplemented with 25 parts by weight of a polyisocyanate (trimethylolpropane-tolylene diisocyanate adduct; Takenate E-31; product of Takeda Chemical Industries). The whole composition was stirred for 30 minutes. The resultant magnetic paint was applied to a polyester film, treated in a magnetic field for orientation, dried and thereafter supercalendered and cured at 60° C. for 2 days. The results of some property measurements are shown in Table 2.

Comparative Example 3

The procedure of the above examples was followed except that a vinyl chloride-vinyl acetate-vinyl alcohol copolymer (III) having no polar group was used in lieu of the vinyl chloride copolymers (I), (II) used in the examples. The results are shown in Table 2.

Comparative Example 4

The procedure of the above examples was followed except that a vinyl chloride-vinyl acetate-vinyl alcohol copolymer (IV) having styrene sulfonic acid sodium salt moieties in a content of 0.2 weight % was used in lieu of the vinyl chloride copolymers (I), (II) used in the examples. The results are shown in Table 1.

TABLE 2

|  | Vinyl chloride copolymer | Surface gloss[1] | Squareness ratio Br/Bm[2] |
|---|---|---|---|
| Example 5 | I | 100 | 0.86 |
| Example 6 | II | 112 | 0.88 |
| Comparative Example 3 | III | 69 | 0.72 |
| Comparative Example 4 | IV | 90 | 0.82 |

As is evident from the table, it was demonstrated that when sulfobetaine-containing vinyl chloride copolymers are used, better dispersion of magnetic powders can be achieved and the magnetic recording media obtained have much improved surface and magnetic characteristics.

What is claimed is:

1. A magnetic recording medium which has a magnetic layer having a binder composition comprising a sulfobetaine-containing resin which is a urethane resin, and wherein the sulfobetaine content in the resin amounts to about 1 to 1,000 equivalents/$10^6$ g.

2. The magnetic recording medium as claimed in claim 1, which is prepared by coating a nonmagnetic support with a binder composition comprising a sulfobetaine-containing resin in an amount such that the film thickness after drying is about 0.1 to 50 μm.

3. In a magnetic recording media binder composition, the improvement which comprises employing as an essential component of the composition, a sulfobetaine-containing resin which is a urethane resin, and wherein the sulfobetaine content in the resin amounts to about 1 to 1,000 equivalents/$10^6$ g.

4. The binder as claimed in claim 3, wherein the urethane resin is one obtained by the reaction of a polyisocyanate with a polyhydroxy compound, a part of the polyhydroxy compound being replaced with a sulfobetaine-containing polyhydroxy compound.

5. The binder as claimed in claim 4, wherein the sulfobetaine-containing polyhydroxy compound is a reaction product from a tertiary amine having two or more hydroxy groups and a sultone of the general formula

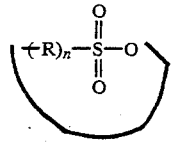

wherein —R— is a straight or branched alkylene group having a carbon number of 1 to 20 and n is an integer of 2 to 20.

6. The binder as claimed in claim 3, wherein the sulfobetaine-containing resin is used in combination with a thermoplastic resin having a softening point not lower than 150° C., an average molecular weight of 10,000 to 200,000 and polymerization degree of about 200 to 2,000.

7. The binder as claimed in claim 3, wherein the sulfobetaine-containing resin is used in combination with a polyisocyanate as a curing agent.

* * * * *